United States Patent
Arima et al.

(10) Patent No.: US 7,391,099 B2
(45) Date of Patent: Jun. 24, 2008

(54) OPTICAL MODULATOR MODULE

(75) Inventors: Hiroyuki Arima, Yokohama (JP);
Masanobu Okayasu, Yokohama (JP);
Osamu Kagaya, Tokyo (JP); Kazuhiko Naoe, Yokohama (JP); Tetsuya Kato, Hiratsuka (JP)

(73) Assignee: Opnext Japan, Inc., Kanagawa (JP)

( * ) Notice: Subject to any disclaimer, the term of this patent is extended or adjusted under 35 U.S.C. 154(b) by 79 days.

(21) Appl. No.: 11/342,883

(22) Filed: Jan. 31, 2006

(65) Prior Publication Data
US 2006/0175676 A1   Aug. 10, 2006

(30) Foreign Application Priority Data
Feb. 7, 2005   (JP)   ............................ 2005-030249

(51) Int. Cl.
*H01L 23/12* (2006.01)
(52) U.S. Cl. ...................................... 257/664
(58) Field of Classification Search ................. 257/664
See application file for complete search history.

(56) References Cited
U.S. PATENT DOCUMENTS 5,982,793 A * 11/1999 Kobayashi et al. ......... 372/38.1
6,856,442 B2 * 2/2005 Matsushima et al. ........ 359/254
6,873,449 B1 * 3/2005 Guan et al. .................. 359/245
7,177,549 B2 * 2/2007 Matsushima et al. ........ 398/182
2003/0174976 A1   9/2003 Fukuda et al.
2003/0202800 A1   10/2003 Matsushima et al.
2004/0070811 A1   4/2004 Matsushima et al.
2004/0264835 A1   12/2004 Matsushima et al.

FOREIGN PATENT DOCUMENTS

JP   2003-318601   11/2003

* cited by examiner

*Primary Examiner*—Evan Pert
(74) *Attorney, Agent, or Firm*—Mattingly, Stanger, Malur & Brundidge PC

(57) ABSTRACT

A high frequency substrate, on which a high frequency substrate transmission line for connecting a chip carrier transmission line and a package substrate transmission line is formed, is mounted while being inclined with respect to a package, so that each distance between the transmission lines can be reduced. Thereby, the lengths of wires for connecting the transmission lines can be reduced so as to improve frequency characteristics of an optical modulator module.

5 Claims, 5 Drawing Sheets

OPTICAL MODULATOR MODULE

CLAIM OF PRIORITY

The present application claims priority from Japanese patent application serial no. 2005-030249, filed on Feb. 7, 2005, the content of which is hereby incorporated by reference into this application.

BACKGROUND OF THE INVENTION

The present invention relates to an optical modulator module, and particularly to the optical modulator module to be used for a transmitter for optical communications.

An optical modulator module has been required to be downsized. JP-A-2003-318601 provides an optical module having a bended transmission line, in which good frequency characteristics can be obtained when being driven at a high frequency, so as to obtain a degree of freedom of the internal arrangement for realization of a high-density package.

A chip carrier 24, a high frequency substrate 29, and a lens 22 are mounted in a package 28 as shown in FIG. 6 in JP-A-2003-318601. An EA-DFB (Electro-Absorption Modulator Integrated Distributed Feedback) laser diode 21 is mounted on the chip carrier 24. The EA-DFB laser diode 21 is optically coupled to an optical fiber 23 via the lens 22. The chip carrier 24 and the high frequency substrate 29 have a chip carrier transmission line 25 and a high frequency substrate transmission line 27, respectively, which are connected to each other via a wire 31. In addition, a package substrate also has a package substrate transmission line 26 which is connected to the high frequency substrate transmission line 27 via a wire 32. A photodiode mounted on a photodiode mount is generally disposed at the rear (opposite to the fiber) of the chip carrier 24.

In the optical modulator module disclosed in JP-A-2003-318601, in the case where the chip carrier transmission line 25 and the package substrate transmission line 26 are not linearly-arranged, the high frequency substrate transmission line 27 is bent without deteriorating the frequency characteristics so as to realize a high-density package while obtaining a good optical output waveform.

US 2003/0202800 A1 is the U.S. counterpart application of JP-A-2003-318601.

In order to downsize the optical modulator module, the reduction in dimension of components while securing a degree of freedom of the arrangement is of importance. There has been a problem in that the more the dimension of components is reduced, the more the inductance components of a wire are increased due to the following reason. In the case where the width of a signal transmission line is 200 µm or more, there is provided means by which the inductance of a wire is decreased by connecting the transmission lines via a ribbon wire or plural wires. However, in the case where the substrate is made thinner and the width of the transmission line is reduced for the sake of further downsizing, it is difficult to use the ribbon wire as well as to arrange the plural wires, which results in no choice but to connect the transmission lines via one wire. Consequently, the inductance components are increased to cause reduction in transmission band of the transmission line, and as a result, the optical output waveform of the optical modulator module is distorted.

In order to solve the problem, it is effective to reduce a distance of the wire connection by improving the dimension accuracy of components and the assembly accuracy of components. However, this improvement causes a sharp rise in cost of components.

SUMMARY OF THE INVENTION

The present invention has been achieved in view of solving the problem, and provides an optical modulator module which does not require to tighten the dimension tolerance of components in order to secure a good optical output waveform and which is suitable for reducing the cost.

The present invention can be achieved in such a manner that the high frequency substrate is arranged at an angle with respect to the optical axis in a gap between the chip carrier and the package substrate.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Hereinafter, several embodiments of the present invention will be described with reference to the drawings. The same numeral is given to the equivalent constituent element in each embodiment, and the explanation thereof will be omitted in the subsequent embodiments.

First Embodiment

Figure 1:
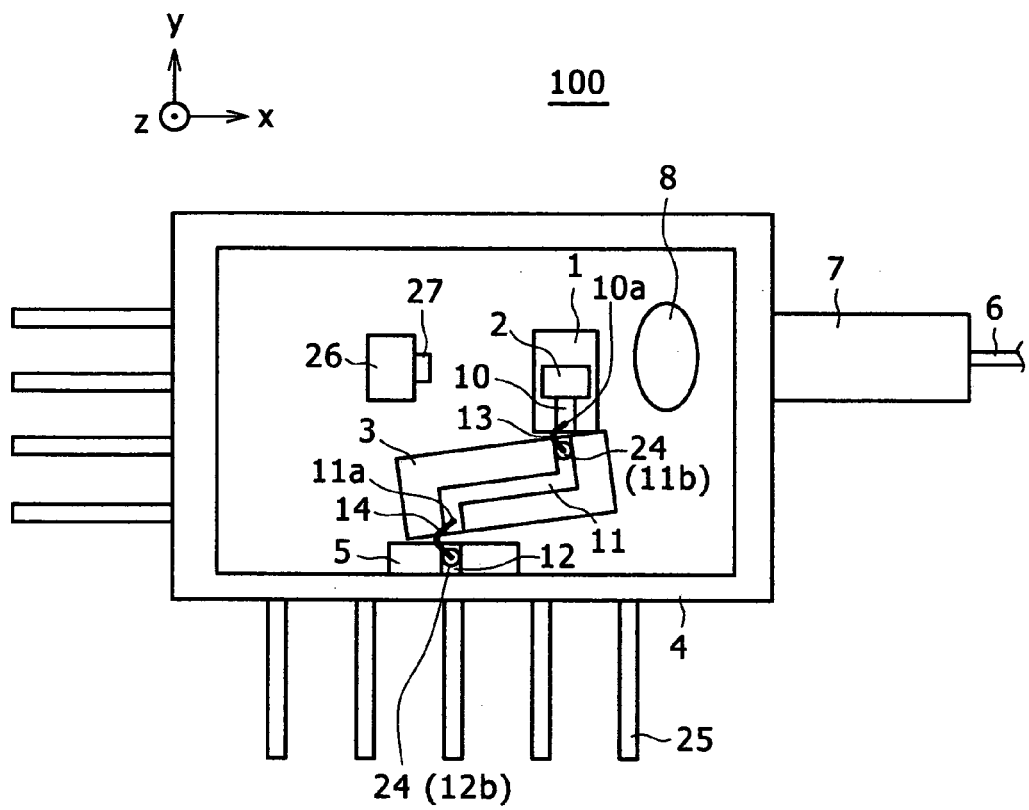
FIG. 1 is a plan view of a DFB laser diode module according to a first embodiment.

An optical modulator module according to a first embodiment of the present invention will be described with reference to FIG. 1. FIG. 1 is a plan view of a DFB laser diode module.

A DFB laser diode module 100 in FIG. 1 has an outer shape in which an optical fiber holder 7 connected to an optical fiber 6 is attached to a package 4 having nine input pins 25. In the package 4, there is formed a package substrate 5 on which a package substrate transmission line 12 connected to one of the input pins 25 is formed.

In assembling the DFB laser diode module 100, a chip carrier 1 having a DFB laser diode 2 mounted and a lens 8 are mounted on the package 4, and the optical fiber 6 is adjusted to be fixed to the package 4 so that light emitted from the DFB laser diode 2 enters to the optical fiber 6 at maximum. There are formed a via hole and a chip carrier transmission line 10 in the chip carrier 1, and the via hole is connected to the backside of the DFB laser diode 2. The chip carrier 1 is a common ground for the optical modulator and the laser diode. A signal input unit (not shown) of the modulator of the DFB laser diode 2 is connected to the chip carrier transmission line 10 via a bonding wire (not shown). A photodiode 27 mounted on a photodiode mount 26 monitors light emitted backward from the DFB laser diode 2.

Between the package substrate transmission line 12 and the chip carrier transmission line 10, there is provided a high frequency substrate 3 in an oblong shape on which a high frequency substrate transmission line 11 having two bended portions is formed and whose length is inclined in the counterclockwise direction by about four degrees from the optical axis direction (x direction). The package substrate transmission line 12 is connected to the high frequency substrate transmission line 11 by a gold wire 14. The chip carrier transmission line 10 is connected to the high frequency substrate transmission line 11 by a gold wire 13. Note that the backsides of the package substrate transmission line 12, the high frequency substrate transmission line 11, and the chip carrier transmission line 10 are grounded. The characteristic impedance of each transmission line is 50Ω, and the pattern width is 100 μm. The numeral 24 denotes a gold ball on the first bonding side of the gold wire. The diameter of the gold wire is 25 μm and the diameter of the gold ball after bonding is 100 μm which is the same as the pattern width.

The optical modulator modulates output light that is continuously emitted from the laser diode on the basis of an electrical signal (modulated signal) being output from a signal source (not shown) so that the DFB laser diode module 100 transmits an optical signal. The electrical signal is transmitted to the optical modulator via each of the above-described transmission lines.

The high frequency substrate transmission line 11 formed on the high frequency substrate 3 runs upward from the vicinity of one of the corners of the high frequency substrate 3 while being in parallel with the width of the high frequency substrate 3, bends at a right angle so as to be in parallel with the length of the high frequency substrate 3, and then bends again so as to be in parallel with the width of the high frequency substrate 3. Accordingly, the high frequency substrate transmission line 11 reaches the vicinity of the opposing corner. The high frequency substrate 3 may be of a square shape. A rectangular shape is utilized as the broader concept of a square shape and an oblong shape. Further, the high frequency substrate transmission line 11 may include a portion that is inclined with respect to the outer shape of the high frequency substrate 3. A connecting portion of the high frequency substrate transmission line 11 with the package substrate transmission line 12 is referred to as an output terminal, and a connecting portion of the high frequency substrate transmission line 11 with the chip carrier transmission line 10 is referred to as an input terminal. As similar thereto, a connecting portion of the package substrate transmission line 12 with the high frequency substrate transmission line 11 is referred to as an input terminal, and a connecting portion of the chip carrier transmission line 10 with the high frequency substrate transmission line 11 is referred to as an output terminal. In consideration of the tolerance of the mounting position for the package substrate and the tolerance of the assembly of the chip carrier, the high frequency substrate 3 is required to have the width shorter than the minimum distance between the package substrate and the chip carrier. Therefore, the distances between the high frequency substrate 3 and the chip carrier and between the high frequency substrate 3 and the package carrier are 200 μm, respectively, in nominal dimension. In order to shorten the distances, the high frequency substrate 3 is inclined with respect to the optical axis, so that the high frequency substrate 3 becomes closer to the package substrate and the chip carrier in the y-coordinate direction. In the meantime, the high frequency substrate 3 is deviated with respect to the package substrate and the chip carrier in the x direction. However, the deviation is small enough to disregard. Inclining the high frequency substrate 3 with respect to the optical axis means that the high frequency substrate 3 is arranged at an angle with respect to the optical axis. In this case, the angle does not include 0 degree (that is, in parallel with the optical axis).

The high frequency substrate 3 is, if being represented in general, a substrate on which each x-y coordinate of an input terminal 11a of the high frequency substrate transmission line 11 differs from each x-y coordinate of an output terminal lib of the high frequency substrate transmission line 11. In other words, each x-y coordinate of an output terminal 12b of the package substrate transmission line 12 differs from each x-y coordinate of an input terminal 10a of the chip carrier transmission line 10.

The high frequency substrate 3 abuts against the chip carrier 1 while being rotated in the counterclockwise direction, and is fixed without abutting against the package substrate 5. The high frequency substrate 3 does not abut against the package substrate 5 because they are not affected by thermal expansion of the package 4. Note that the abutment in this specification means that the minimum distance between the two transmission substrates is 50 μm or less by measuring the distance on the surface of the transmission substrate. On the contrary, no abutment means that the minimum distance between the two transmission substrates is more than 50 μm. The minimum distance between the two transmission substrates is measured by a micrometer mounted on a microscope.

The high frequency substrate 3 in an oblong shape is mounted while being inclined with respect to the side faces of the package in the first embodiment, so that the distance between transmission lines can be made shorter, the bonding wire can be made shorter, and the modulator module with excellent characteristics can be obtained. Note that the content of improvement will be described in greater detail in a second embodiment.

The first embodiment is described by using the DFB laser diode module. However, the same effect can be obtained even by using the optical modulator module with no laser diode, which is applicable to the following embodiments. Note that the DFB laser diode module is the optical modulator module because the DFB laser diode module includes the modulator.

Further, the high frequency substrate 3 is made to abut against the chip carrier 1 in the above-described embodiment. However, the high frequency substrate 3 may abut against the package substrate 5 without abutting against the chip carrier 1. Fixing the high frequency substrate 3 in such a manner allows the bonding wire, which is provided on the side where the high frequency substrate 3 does not abut, to absorb the extension and contraction caused by temperature change of the package, and as a result, the modulator module having good characteristics and high reliability can be realized. This is commonly applicable to the following embodiments.

Second embodiment

Figure 2:
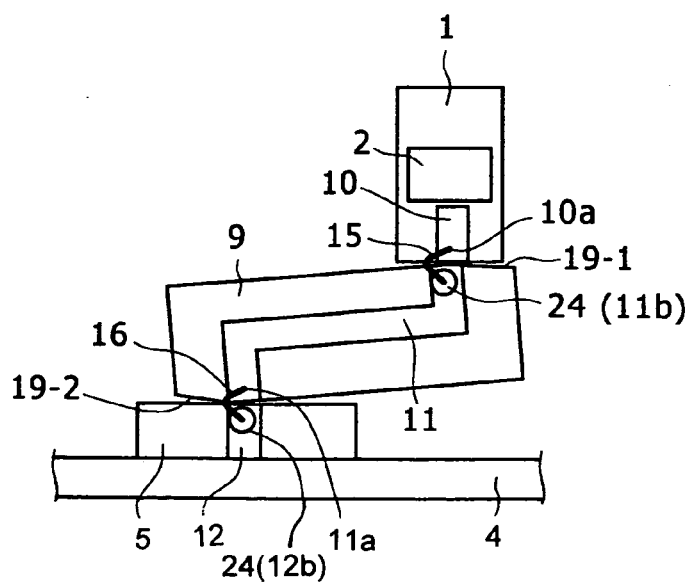
FIG. 2 is a plan view of main parts of a DFB laser diode module according to a second embodiment.
Figure 3:
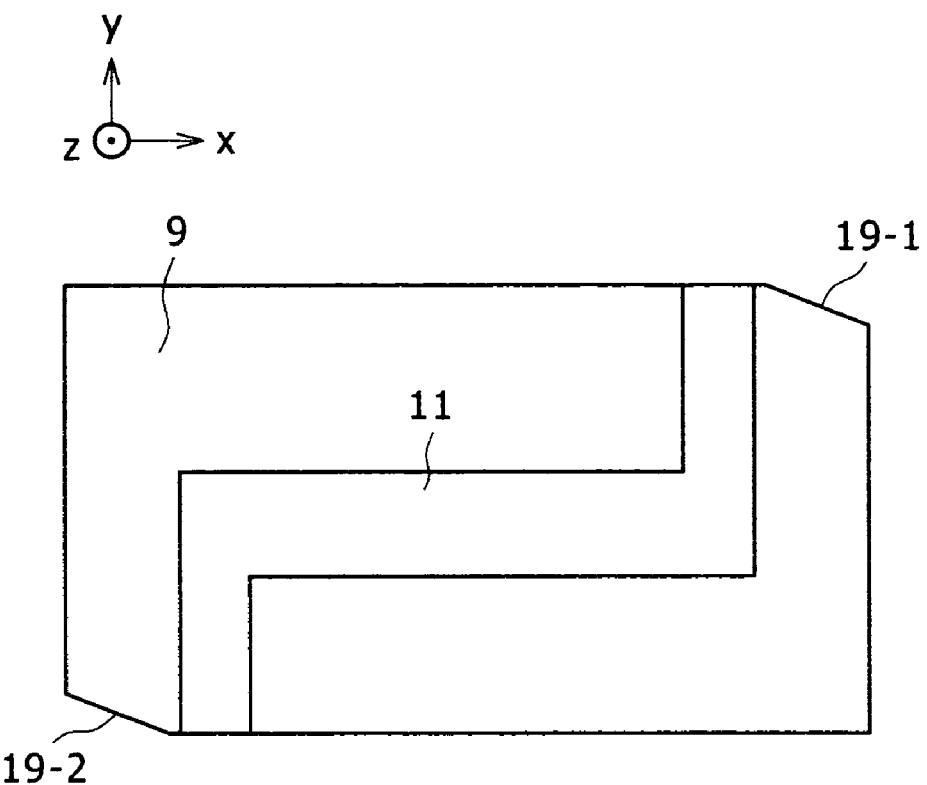
FIG. 3 is a plan view of a high frequency substrate.
Figure 4:
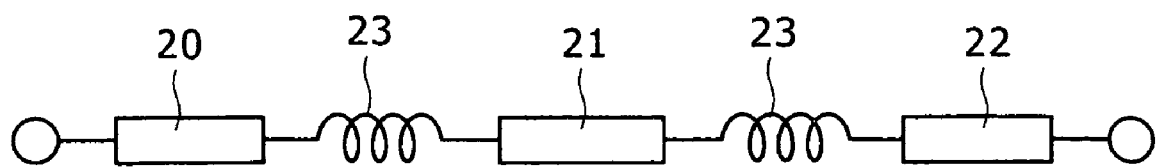
FIG. 4 is an equivalent circuit of transmission lines of the DFB laser diode module.
Figure 5:
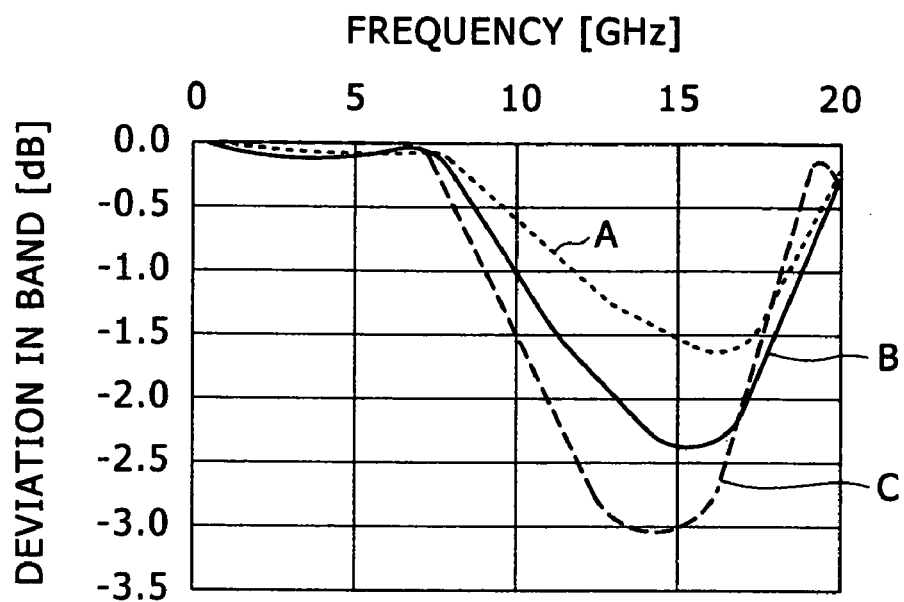
FIG. 5 is a diagram explaining deviation in band of the transmission lines of the DFB laser diode module.
Figure 6:
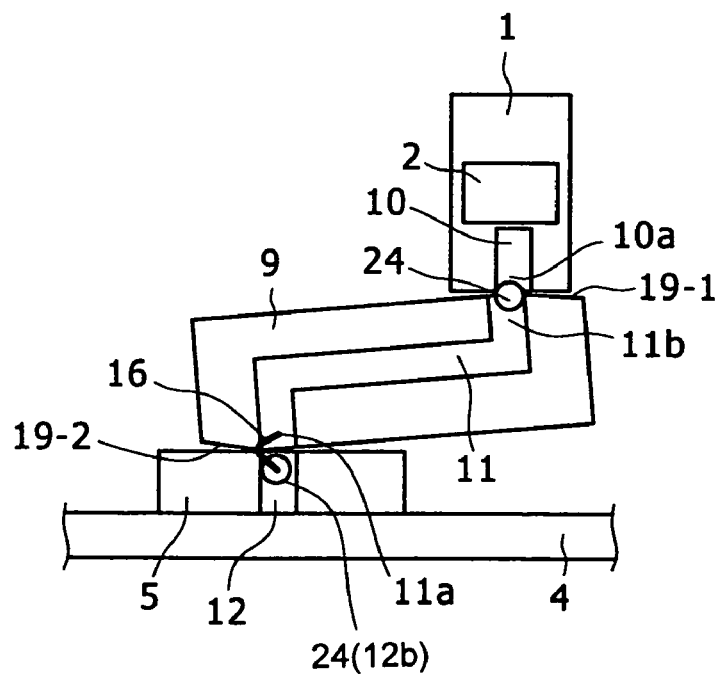
FIG. 6 is a plan view of main parts of the DFB laser diode module obtained by modifying the second embodiment.

An optical modulator module according to the second embodiment of the present invention will be described with reference to FIGS. 2 to 6. FIG. 2 is a plan view of a DFB laser diode module. FIG. 3 is a plan view of a high frequency substrate. FIG. 4 is an equivalent circuit of transmission lines of the DFB laser diode module. FIG. 5 is a diagram explaining deviation in band of the transmission lines of the DFB laser diode module. FIG. 6 is a plan view of main parts of an EA-DFB laser diode module obtained by modifying the second embodiment.

In FIG. 3, a high frequency substrate 9 according to the second embodiment is provided with chamfered portions 19 at the corners in the vicinity of the ends of the high frequency substrate transmission line 11. The provision of the chamfered portions 19 allows the wire length between the chip carrier transmission line 10 and the high frequency substrate transmission line 11 and the wire length between the high frequency substrate transmission line 11 and the package substrate transmission line 12 to be shorter in the case where the high frequency substrate 9 is arranged while being inclined with respect to the side faces of the chip carrier 1 and the package substrate 5.

In FIG. 2, the high frequency substrate 9 is arranged while being inclined in the counterclockwise direction in such a manner that the side face of the high frequency substrate 9 abuts against the side face of the chip carrier 1 in the vicinity of a chamfered portion 19-1 and the other side face of the high frequency substrate 9 does not abut against the side face of the package substrate 5. The end portions of the chip carrier transmission line 10 and the package substrate transmission line 12 can be made closer to the corresponding end portions of the high frequency substrate transmission line 11 of the high frequency substrate 9 by chamfering the corners of the high frequency substrate 9. Accordingly, the lengths of wires 15 and 16 are made shorter as compared to the case where the corners of the high frequency substrate 9 are not chamfered. Shortening the lengths of the wires 15 and 16 improves a decrease in transmission band.

Effects of the first and second embodiments will be described with reference to FIGS. 4 and 5. FIG. 4 is an equivalent circuit from the chip carrier transmission line 10 to the package substrate transmission line 12 of the EA-DFB laser diode module as shown in FIG. 1 or 2. This model is configured by a chip carrier substrate transmission line model 20, a high frequency substrate transmission line model 21, a package substrate transmission line model 22, and a wire model 23 in which wires are represented by inductances.

FIG. 5 shows results in which transmission bands of the transmission lines of the EA-DFB laser diode module where arranging methods of the high frequency substrate are parameterized are simulated by using the equivalent circuit shown in FIG. 4

The horizontal axis of the graph represents a frequency, and the vertical axis represents deviation in band. The deviation in band is calculated by using a value at a frequency of 1 GHz as a standard. The EA-DFB laser diode module is assumed to operate at 10 Gbits/s, and therefore the deviation in band is simulated up to 20 GHz. c in FIG. 5 represents a case where the length of the high frequency substrate is arranged while being aligned to the optical axis direction. B in FIG. 5 represents a case where the high frequency substrate with no chamfered portions is arranged while being rotated in the counterclockwise direction so as to abut against the chip carrier. Further, A in FIG. 5 represents a case where the high frequency substrate with the chamfered portions is arranged while being rotated in the counterclockwise direction so as to abut against the chip carrier. The inductance of the wire model 23 becomes small in the case where the high frequency substrate abuts against the chip carrier.

The result shows that the deviation in band at 10 GHz is improved from −1.59 dB to −0.99 dB by arranging the high frequency substrate while inclining the same with respect to the wall surfaces of the package, and further the deviation in band at 10 GHz is improved to −0.60 dB by using the high frequency substrate with the chamfered portions. This simulation clarifies that the transmission band of the EA-DFB laser diode module is improved.

According to the second embodiment, the chamfer of the corners of the high frequency substrate can suppress an increase in wire inductance, a decrease in transmission band of the EA-DFB laser diode module, and distortion of an optical output waveform, in the case where it is difficult to arrange plural wires in parallel or to use a ribbon wire because width of a signal electrode of the transmission line is narrow.

Note that a chamfer angle may not be 45 degrees (45 degrees chamfer), but may be about 4 degrees. The angle is preferably about 10 degrees. Further, the chamfer may be a round chamfer.

A modified embodiment of the second embodiment will be described with reference to FIG. 6. A unique point where FIG. 2 differs from FIG. 6 is that the chip carrier transmission line 10 is connected to the high frequency substrate transmission line 11 via the bonding wire 15 or the gold ball 24.

The high frequency substrate 9 is chamfered up to the vicinity of the high frequency substrate transmission line 11, and accordingly if the high frequency substrate 9 abuts against the chip carrier, the distance between the high frequency substrate transmission line 11 and the chip carrier transmission line 10 becomes in the order of 50 μm. If the gold ball that is the first bonding of the wire bonding is provided so that the gold ball bridges the high frequency substrate transmission line 11 and the chip carrier transmission line 10 and if the wire is cut right after that, the gold ball 24 can be realized. The connection by the gold ball is the connection by the bonding wire.

The gold ball 24 that is the first bonding of the wire bonding is 100 μm in diameter as described above, and it is essential to separate the first bonding portion from the second bonding portion by 50 μm or more, even though the outer shape of the bonding capillary is disregarded. It is a matter of course that the gold wire needs to make a loop and has inductance. On the other hand, the gold ball does not need to make a loop and has an effect of decreasing inductance.

In this embodiment, the connection of the chip carrier transmission line 10 to the high frequency substrate transmission line 11 is made by welding the gold ball. However, brazing, soldering, and the like are applicable. This modified embodiment is applicable to the third embodiment.

Third Embodiment

Figure 7:
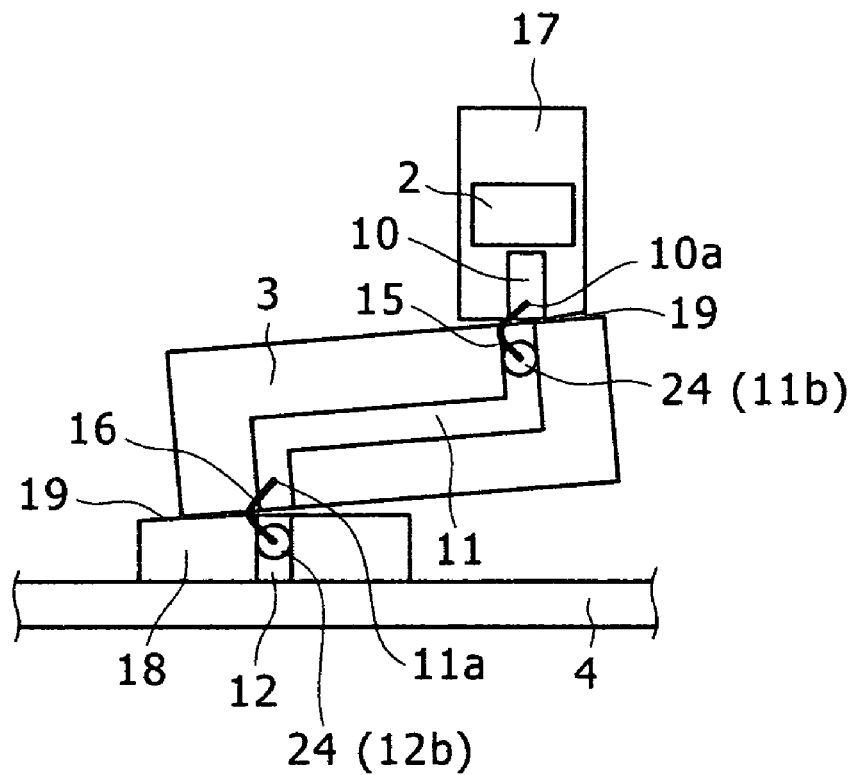
FIG. 7 is a plan view of main parts of a DFB laser diode module according to a third embodiment.
Figure 8:
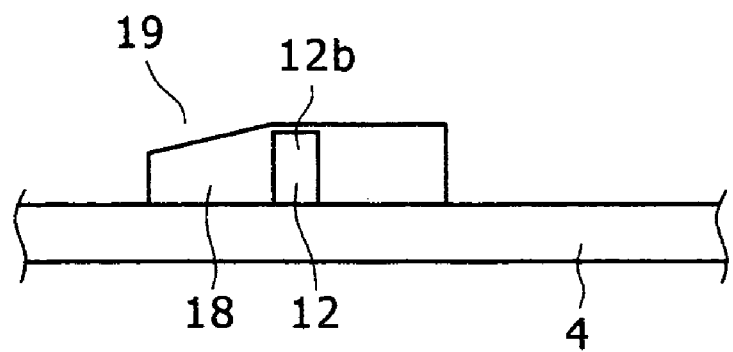
FIG. 8 is a plan view of a package substrate.
Figure 9:
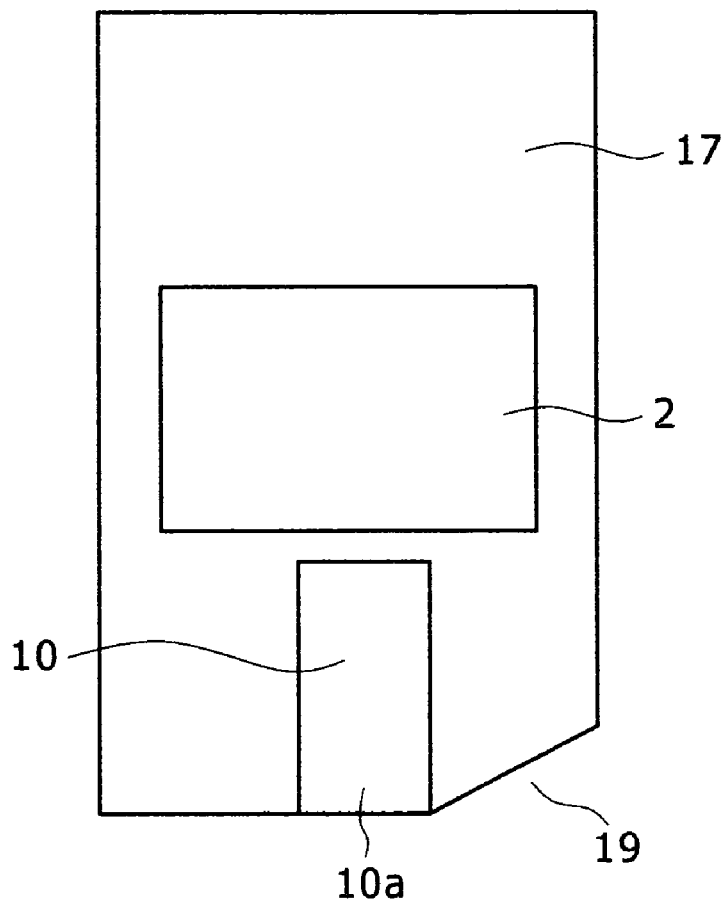
FIG. 9 is a plan view of a chip carrier substrate.

An optical modulator module according to a third embodiment of the present invention will be described with reference to FIGS. 7 to 9. FIG. 7 is a plan view of main parts of a DFB laser diode module. FIG. 8 is a plan view of a pack-age substrate. FIG. 9 is a plan view of a chip carrier substrate.

A package substrate 18 shown in FIG. 8 has the chamfered portion 19 formed at the left corner (opposite to the optical axis direction) of the package substrate transmission line 12. Further, a chip carrier substrate 17 shown in FIG. 9 has the chamfered portion 19 formed at the right corner (the optical axis direction) of the chip carrier transmission line 10. These chamfered portions serve as a relief with respect to aforementioned high frequency substrate. Therefore, the relief is not limited to be in a chamfered shape, but may be in a dent shape.

In FIG. 7, the high frequency substrate 3, on which there is formed the high frequency substrate transmission line 11 that bridges and connects the chip carrier transmission line 10 and the package substrate transmission line 12, is fixed in such a manner that the high frequency substrate 3 is rotated in the counterclockwise direction between the chip carrier 17 and the package substrate 18 so as to abut against the chip carrier 17 without abutting against the package substrate 18. The wire length between the chip carrier transmission line 10 and the high frequency substrate transmission line 11 can be made shorter by providing the chamfer portions to not the high frequency substrate 3 but the chip carrier 17 and the package substrate 18, as compared to the case where no chamfered portions are provided. As similar thereto, the wire length between the high frequency substrate transmission line 11 and the package substrate transmission line 12 can be made shorter.

According to the third embodiment, shortening the lengths of the wires 15 and 16 can minimize a decrease in transmission band due to wire inductance, and can suppress distortion of optical output characteristics of the DFB laser diode module.

According to the third embodiment, it is possible to obtain a good optical output waveform without tightening the dimension tolerance of components of the transmission lines in the optical modulator module of a high-density package.

What is claimed is:

1. An optical modulator module comprising:
    an optical modulator for modulating light on the basis of an electrical signal;
    a chip carrier on which the optical modulator is mounted and a first transmission line is formed;
    a package substrate which is connected to a package and on which a second transmission line is formed; and
    a high frequency substrate which is arranged between said chip carrier and said package substrate and on which a third transmission line is formed, said third transmission line being connected to both said first transmission line and said second transmission line, wherein
    each x coordinate each y coordinate of an input terminal of said first transmission line differs from each x coordinate and each y coordinate of an output terminal of said second transmission line;
    said high frequency substrate in a rectangular shape is arranged so that said high frequency substrate abuts against said chip carrier or said package substrate in the vicinity of one corner of said high frequency substrate while a corner opposite to said one corner is made closer to said chip carrier or said package substrate; and
    the connection of said first transmission line and said third transmission line or the connection of said second transmission line and said third transmission line is made by wire bonding.

2. The optical modulator module according to claim 1, wherein
    the minimum value of a distance between said high frequency substrate and said chip carrier is 50 μm or less, and the minimum value of a distance between said high frequency substrate and said package substrate is more than 50 μm.

3. The optical modulator module according to claim 1, wherein
    the minimum value of a distance between said high frequency substrate and said chip carrier is more than 50 μm, and the minimum value of a distance between said high frequency substrate and said package substrate is 50 μm or less.

4. The optical modulator module according to claim 1, wherein
    said high frequency substrate is chamfered at an angle of four degrees or more at least any one of said one corner and said corner opposite to said one corner.

5. The optical modulator module according to claim 1, wherein
    a relief against said high frequency substrate is formed in the vicinity of a portion, against which said high frequency substrate abuts, of said chip carrier or said package substrate.

* * * * *